United States Patent [19]

Joboji et al.

[11] Patent Number: 4,980,627
[45] Date of Patent: Dec. 25, 1990

[54] NUMERICALLY CONTROLLED APPARATUS

[75] Inventors: Nobuaki Joboji; Isao Sakamoto, both of Toyama; Kouichi Ishikawa, Aichi; Makoto Konno, Aichi; Kazuo Imanishi, Aichi, all of Japan

[73] Assignees: Mitsubishi Denki Kabushiki Kaisha; Nippei Toyama Corporation, both of Tokyo, Japan

[21] Appl. No.: 499,710

[22] Filed: Mar. 27, 1990

[30] Foreign Application Priority Data

Mar. 31, 1989 [JP] Japan ................................. 1-80908

[51] Int. Cl.⁵ ........................................... G06F 11/00
[52] U.S. Cl. .................................. 318/570; 318/571; 318/632; 318/563; 318/615; 364/474.32; 364/474.35
[58] Field of Search ............................. 318/560–640; 364/474.01–474.33

[56] References Cited

U.S. PATENT DOCUMENTS 4,706,003 11/1987 Nakashima et al. ............ 318/615 X
4,718,078 1/1988 Bleidorn et al. ................ 318/563 X
4,779,204 10/1988 Kanematsu et al. ............ 318/571 X
4,839,817 6/1989 Fujimoto ........................ 364/474.32
4,902,951 2/1990 Ohta et al. ...................... 318/571 X Primary Examiner—William M. Shoop, Jr.
Assistant Examiner—Paul Ip
Attorney, Agent, or Firm—Burns, Doane, Swecker & Mathis

[57] ABSTRACT

A numerically controlled apparatus wherein a tool can be returned by a high speed retrograding operation without damaging a chip of a tool or a work. The numerically controlled apparatus comprises a command executing block which decodes a working program for each of block commands and controls controlling driving of a tool to work a work. A retrograde command storage block extracts data necessary for the production of a retrograde block command from the working program and stores the extracted data therein. Upon reception of a retrograding signal, an escapement command producing block produces an escapement block command, and a retrograde block command producing means produces a retrograde block command. Then, an escapement/retrograde command execution controlling block causes the command executing block to execute the escapement block command and the retrograde block command.

3 Claims, 19 Drawing Sheets

FIG. 16(a)
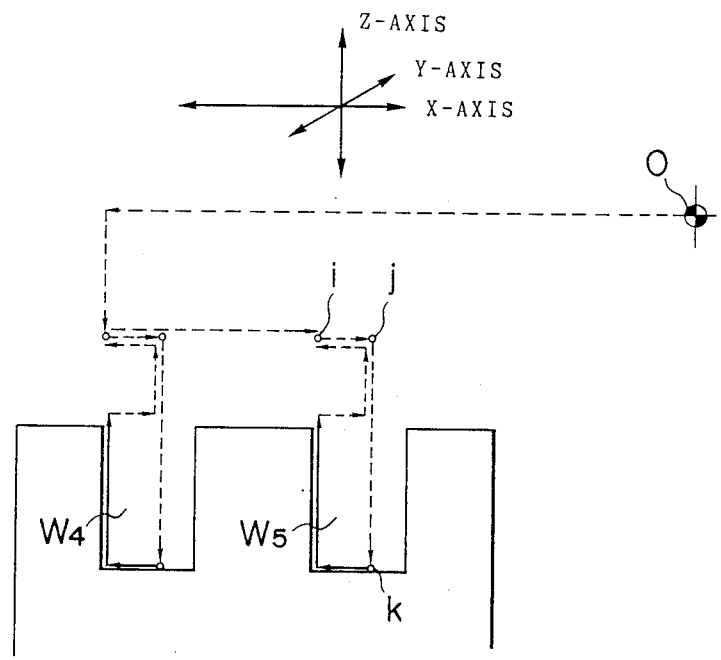
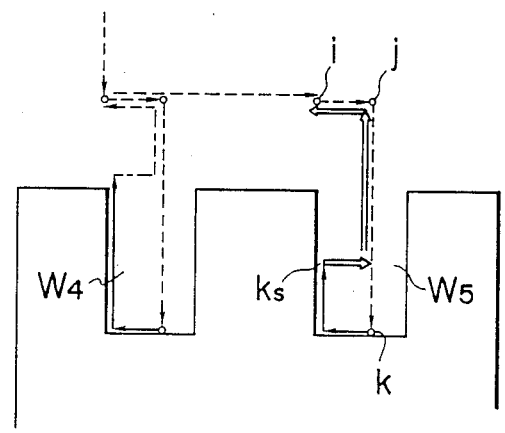
FIG. 16(b)

NUMERICALLY CONTROLLED APPARATUS

BACKGROUND OF THE INVENTION

1. Field of the Invention

This invention relates to a numerically controlled apparatus, and more particularly to a numerically controlled apparatus which can make a retrograding operation.

2. Description of the Prior Art

A numerically controlled apparatus having a so-called retrograding function is already known wherein the process of working retrogrades along a working route in response to reception of a retrograding command during working.

FIG. 18 shows an exemplary one of conventional numerically controlled apparatus having a retrograding function. Referring to FIG. 18, the numerically controlled apparatus shown includes an interpolation pre-processing section 2 for receiving a working program stored in a working program storage medium 1 and composed of a plurality of command blocks, a retrograde block processing section 3 for selecting information necessary for the production of a retrograde block command in accordance with the working program received from the interpolation pre-processing section 2, an interpolation processing section 4, an acceleration/deceleration controlling section 5, a feeding device 6, a retrograding processing section 7, and a retrograde stock storage section 8.

In operation, the interpolation pre-processing section 2 reads the working program block by block from the working program storage medium 1 and outputs data of an amount of the feeding device 6 to move, a position of a starting point, a position of an ending point, a feeding speed and so forth to the interpolation processing section 4 by way of the retrograde block processing section 3.

The interpolation processing section 4 executes interpolation processing in accordance with the data outputted from the interpolation pre-processing section 2 and outputs a result of the interpolation processing to the acceleration/deceleration processing section 5.

The acceleration/deceleration processing section 5 thus controls a tool not shown to move in accordance with the result of the interpolation processing of the interpolation processing section 4, thereby to work a work not shown.

By the way, during such working of a work, the working may sometimes be interrupted by some cause such as hitting by a stroke of lightning. In such an instance, the tool will be moved back using a retrograding function of the numerically controlled apparatus.

To this end, the retrograde block processing section 3 stores, during working of a work, in accordance with results of decoding of block commands, necessary data for the interpolation for a retrograding operation such as a starting point of each block command and a command speed as well as, when a block command is based on a circular interpolation, coordinates of the center, a radius and so forth of a circle into the retrograde block storage section 8 in accordance with the order of decoding of the block commands. Then, when a retrograding signal is received in response to interruption of working, the retrograde block processing section 3 successively reads out the data stored in the retrograde block storage section 8 in an order reverse to the order in storage of the data to cause the interpolation processing section 4 to execute an operation in accordance with the read out data. Consequently, the route along which the working has been carried out is interpolated reversely to return the tool to a suitable point of the route.

Referring now to FIG. 19, there is shown another exemplary one of conventional numerically controlled apparatus. The numerically controlled apparatus shown includes a working program processing section 12 for reading a working program from a working program storage medium 11 and decoding the the working program thus read, a mechanical controlling section 13 for producing numerically controlling commands (commands for moving individual axes, speed commands and mechanical sequence controlling commands) from data of the working program decoded by the working program processing section 12 and external mechanical controlling signals, an interpolation pulse distributor 14 for interpolating commands for the axes from the mechanical controlling section 13, a pair of servo controlling sections 15 for individually driving servomotors 16 for the axes, a mechanical input/output processing section 17 for transmitting and receiving signals to and from a mechanical and strong electric circuit section not shown, a setting section 42 for setting and storing in advance therein as a parameter a retracting position to which a tool not shown is to be retracted upon interruption of working, and a retraction controlling section 43 for executing retracting control of the tool in response to an external signal.

In operation, when an operation starting signal is received, the mechanical controlling section 13 commands the working program processing section 12 to read the working program.

The working program processing section 12 thus reads out and decodes the working program for each block from the working program storage medium 11 and outputs axis command data and sequence controlling commands to the interpolation pulse distributor 14 and the mechanical input/output processing section 17 by way of the mechanical controlling section 13.

The interpolation pulse distributor 14 controls the servo controlling sections 15 in accordance with the received axis command data to control driving of the servomotor 16s. Meanwhile, the mechanical input/output processing section 17 executes sequence control in accordance with the sequence control commands received.

After then, such decoding of the working program, outputting of axis command data and sequence control commands as well as axis control and sequence control as described above are executed repetitively to work the work not shown.

In case the working is interrupted due to emergency stopping or the like during such working, the tool not shown is retracted from the work. Then, when a returning signal is received, the retraction controlling section 43 gives up the working which has been carried out so far and produces and outputs to the mechanical controlling section 13 a returning command for returning the tool from a position upon such interruption to a retracted position set by the setting section 42.

By the way, a sub program of a so-called fixed cycle is sometimes executed wherein a series of routine sequences which are naturally programmed in several blocks are commanded in a single block so as to simplify programming of a working program.

FIG. 20 schematically shows a numerically controlled apparatus which executes such a sub program of a fixed cycle as described above. In FIG. 20, like elements having like functions to those of FIG. 19 are denoted by like reference numerals and overlapping description thereof is omitted herein.

Referring to FIG. 20, the numerically controlled apparatus shown includes, in addition to a working program processing section 12, a mechanical controlling section 13, an interpolation pulse distributor 14, a pair of servo controlling sections 15 and a mechanical input/output processing section 17, a memory 18 having sub programs of a fixed cycle stored therein, another memory 52 having stored therein tool retracting programs which are produced for individual fixed cycle commands taking a profile of a work into consideration in advance, and a retraction controlling section 53 for executing, when a returning signal is received from an outside, retracting control in accordance with contents stored in the memory 52.

The numerically controlled apparatus shown in FIG. 20 normally operates in a similar manner to that shown in FIG. 19.

On the other hand, when working is interrupted due to emergency stopping or the like while an operation of a fixed cycle is being executed, a tool not shown is retracted from a work not shown. Then, when a returning signal is received, the retraction controlling section 53 gives up the working and executes the tool extracting program for the interruption of a fixed cycle stored in the memory 52 to produce and output movement commands to the mechanical controlling section 13. The mechanical controlling section 13 executes the movement commands to retract the tool to a position at which the operation of the fixed cycle has been started.

By the way, with the conventional numerically controlling apparatus shown in FIG. 18, since a tool is retracted, upon retrograding movement, while it is held in contact with a work, there is a problem that the work is likely to be damaged and, depending upon a type of the tool, the chip of the tool may be damaged. It is also disadvantageous in that, since the speed of retracting movement is equal to the speed upon cutting, much time is required for such retracting movement.

Meanwhile, with the conventional numerically controlled apparatus shown in FIG. 19, there is a problem that, if a tool is returned to a retracted position set in advance, then, depending upon a working route of the tool, a profile of a work or the like, the tool may interfere with the work and cannot be returned readily.

Further, with the conventional numerically controlled apparatus shown in FIG. 20, there is a problem that a retraction program must be produced for each fixed cycle taking a profile of a work into consideration in advance, and the programming steps are increased.

SUMMARY OF THE INVENTION

It is an object of the present invention to provide a numerically controlled apparatus wherein a tool can be returned by a high speed retrograding operation without damaging a chip of a tool or a work.

It is another object of the present invention to provide a numerically controlled apparatus wherein a tool can be returned to an arbitrary position with safety.

It is a further object of the present invention to provide a numerically controlled apparatus wherein a tool can be returned, upon interruption of working in a fixed cycle, to a starting position of the fixed cycle readily with safety.

In order to attain the objects, according to one aspect of the present invention, there is provided a numerically controlled apparatus which comprises a block command executing means for decoding a working program composed of a plurality of block commands for each of such block commands and controlling driving of a tool to work a work, a retrograde block command storage means for extracting data necessary for the production of a retrograde block command from the working program and storing the extracted data therein, an escapement block command producing means for producing, upon reception of a retrograding signal, an escapement block command for moving the tool away from the work in accordance with a current position of the tool and a preset escapement amount, a retrograde block command producing means for producing a retrograde block command for causing the tool to retrograde in accordance with the data stored in the retrograde block command storage means, and an escapement/retrograde block command excution controlling means for causing the block command executing means to execute the escapement block command and the retrograde block command.

With the numermically controlled apparatus, the block command executing means decodes a working program for each of block commands and controls driving of a tool to work a work, and the retrograde block command storage means extracts data necessary for the production of a retrograde block command from the working program and stores the extracted data therein. Upon reception of a retrograding signal, the escapement block command producing means produces an escapement block command and the retrograde block command producing means produces a retrograde block command, and the escapement/retrograde block command execution controlling means causes the block command executing means to execute the escapement block command and the retrograde block command.

Accordingly, even if a retrograding operation is carried out, the tool is not contacted with the work, and there is an effect that the numerically controlled apparatus can make a retrograding operation at a high speed without damaging the work and without damaging the chip of the tool.

According to another aspect of the present invention, there is provided a numerically controlled apparatus which comprises a block command executing means for decoding a working program composed of a plurality of block commands for each of such block commands and controlling driving of a tool to work a work, a nonvolatile return position storage means for updating and storing, in case a return position is designated by the working program when the working program is to be executed for each of the block commands, the return position therein, a return block command producing means for producing, upon reception of an interrupt signal, a return block command for returning the tool from a current position of the tool to the return position stored in the return position storage means, and a return block execution controlling means for causing the block command executing means to execute the return block command.

With the numerically controlled apparatus, the block command executing means decodes a working program for each of block commands and controls driving of a tool to work a work, and the return position storage means updates and stores a return position designated by the working program when the working program is executed. Upon reception of an interrupt signal, the return block command producing means produces a return block command, and the block execution controlling means causes the block command executing means to execute the return block command.

Accordingly, there are effects that a safe return position can be designated depending upon a type of working and a working position and that the tool can be returned from a point at which the working has been interrupted to a latest return position.

Further, where the retraction block command includes interpolation block commands for the X—, Y— and Z—axes, the tool can be retracted, even in retraction in an oblique direction, to a return position along an inclined route (interpolation route).

According to a further aspect of the present invention, there is provided a numerically controlled apparatus which comprises a block command executing means for decoding a working program of a fixed cycle composed of a plurality of block commands for each of such block commands and controlling driving of a tool to work a work, a relay point storage means for storing a position of a relay point designated by the program of the fixed cycle, a retraction block command producing means for producing, when working of the fixed cycle is interrupted, a retraction block command for retracting the tool from a position at which the working is interrupted to the relay point which has been stored into the relay point storage means immediately before the interruption of the working in accordance with a route and an amount of movement of the tool when the working of the fixed cycle is interrupted, and a retraction block execution controlling means for causing the block command executing means to execute the retraction block command.

With the numerically controlled apparatus, the block command executing means decodes a working program for each of block commands and controls driving of a tool to work a work, and the relay point storage means stores therein a position of a relay point designated by the program of the fixed cycle. The retraction block command producing means produces, when working of the fixed cycle is interrrupted, a retraction block command, and the retraction block execution controlling means causes, upon reception of a return signal, the block command executing means to execute the retraction block command.

Accordingly, a return position can be designated depending upon a type of working and a working position and a retracting operation of the tool from a point at which the working has been interrupted to the return position without producing a retracting program for each command of a fixed cycle taking a profile and so forth of the work into consideration. Accordingly, there is an effect that the tool can be retracted with safety.

The above and other objects, features and advantages of the present invention will become apparent from the following description and the appended claims, taken in conjunction with the accompanying drawings in which like parts are denoted by like reference characters all through the drawings.

BRIEF DESCRIPTION OF THE DRAWINGS

FIG. 10 is a schematic illustration of a working program to be transmitted to a working program processing section shown in FIG. 8;

FIG. 15 is a schematic illustration showing a working program to be transmitted to a working program processing section shown in FIG. 13;

FIGS. 16a and 16b are diagrammatic representations each illustrating a retrograding operation;

DESCRIPTION OF THE PREFERRED EMBODIMENTS

Figure 1:
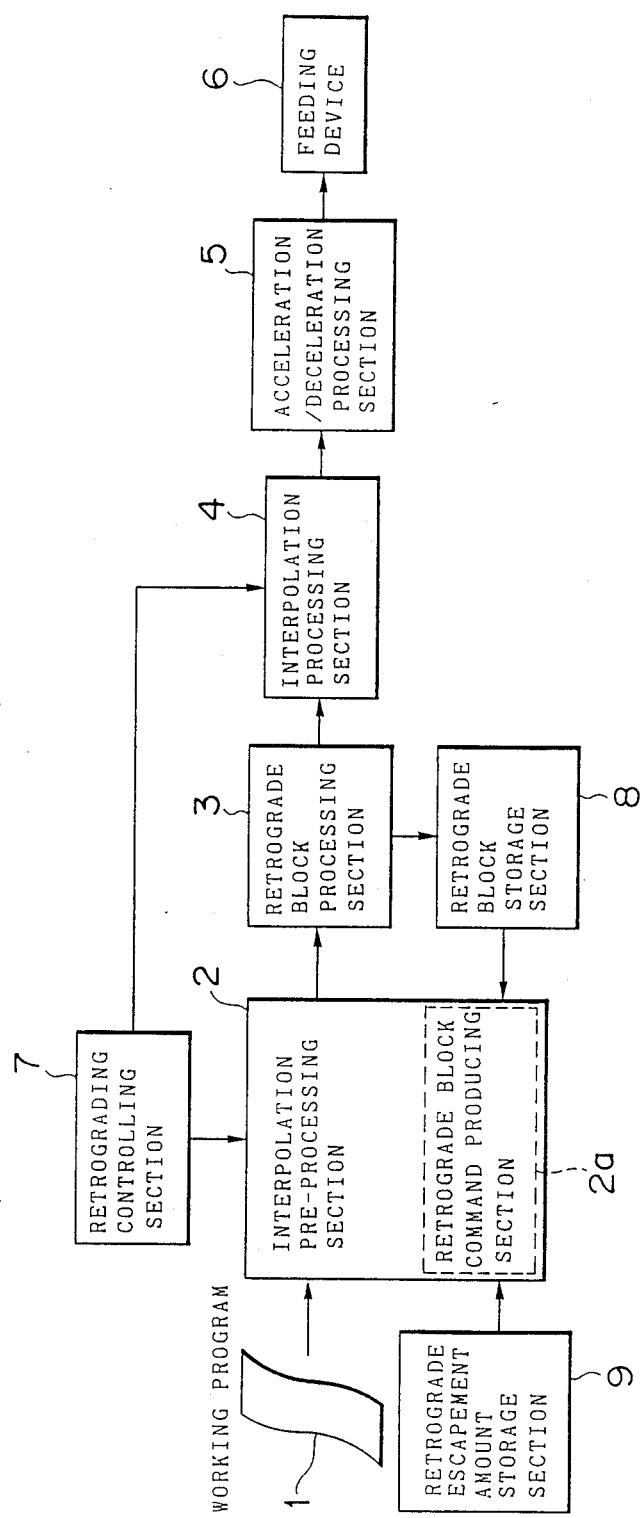
FIG. 1 is a block diagram of a numerically controlled apparatus showning a preferred embodiment of the present invention.

Referring first to FIG. 1, there is shown a numerically controlled apparatus of a preferred embodiment of the present invention. The numerically controlled apparatus shown includes an interpolation pre-processing section 2 for receiving a working program stored in a working program storage medium 1 and composed of a plurality of block commands. The interpolation pre-processing section 2 has a retrograde block command producing section 2a for producing a retrograde block command. The numerically controlled apparatus further includes a retrograde block processing section 3 for selecting information necessary for the production of a retrograde block command in accordance with the working program 3 received from the interpolation pre-processing section 2, an interpolation processing section 4, an acceleration/deceleration processing section 5, a feeding section 6, a retrograde controlling section 7, a retrograde block storage section 8, and a retrograde escapement amount storage section 9 for storing therein an amount of escapement of a tool not shown.

Figure 2:
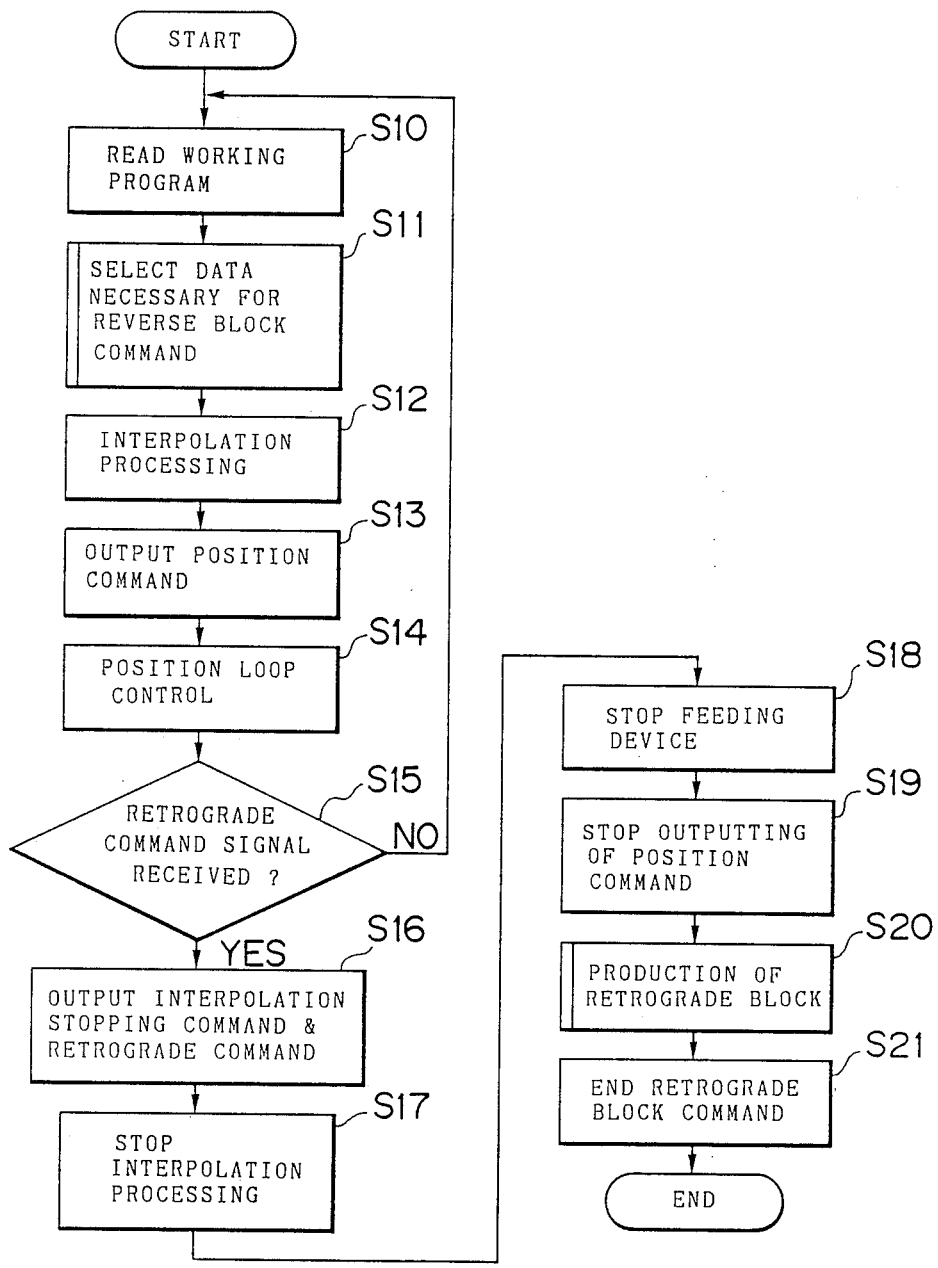
FIG. 2 is a flow chart illustrating operation of the numerically controlled apparatus shown in FIG. 1.

Subsequently, operation of the numerically controlled apparatus shown in FIG. 1 will be described with reference to the flow chart of FIG. 2.

At first at step S10, the interpolation pre-processing section 2 reads the working program from the working program storage medium 1 and outputs data of an amount of movement, a position of a start point, a position of an end point, a feeding speed and so forth for the feeding device 6 to the retrograde block processing section 3.

Figure 3:
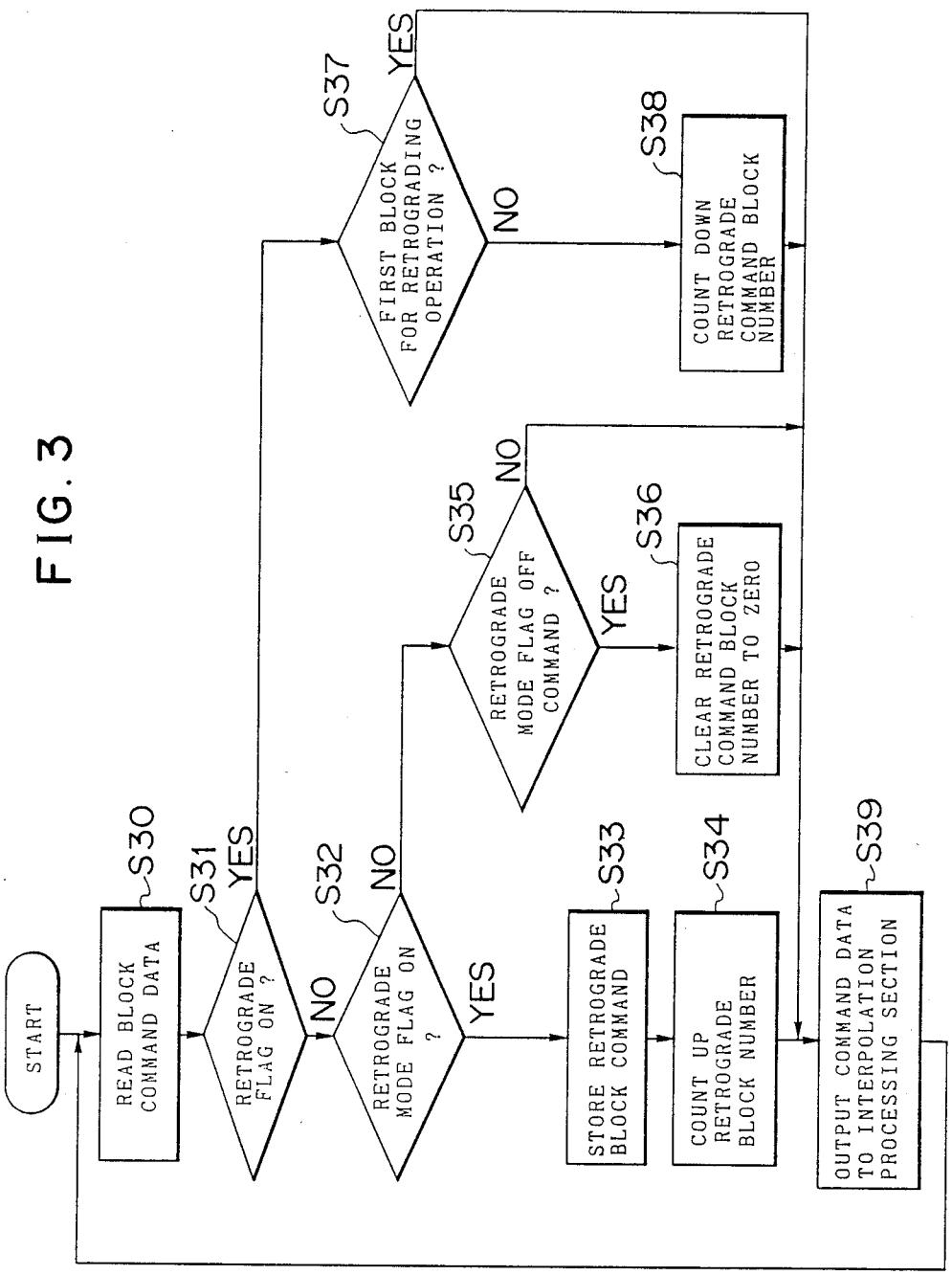
FIG. 3 is a flow chart illustrating operation of a retrograde block processing section shown in FIG. 1.

Then at step S11, the retrograde block processing section 3 selects, when the block command includes a retrograde mode on command, data necessary for the production of a retrograde block command in accordance with the flow chart of FIG. 3 until a retrograde mode off command is encountered.

Referring now to FIG. 3, after the retrograde block processing section 3 receives data of a block command from the interpolation pre-processing section 2 at step S30, it is judged, at step S31, depending upon a value of a retrograde flag whether or not the feeding device 6 is feeding in an advancing direction or in a retrograding direction.

Figure 4:
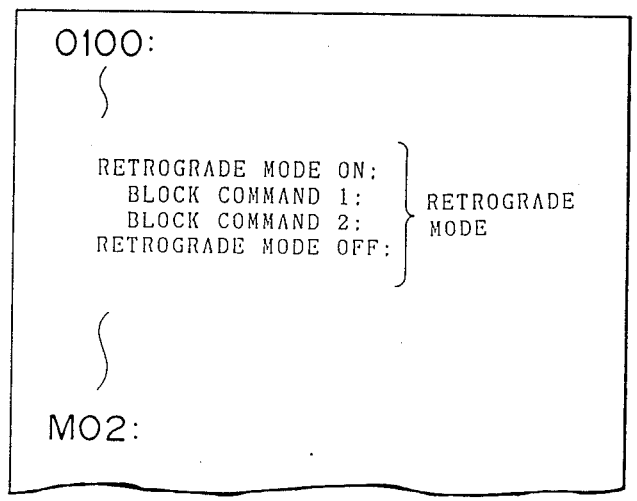
FIG. 4 is a schematic illustration showing a working program to be transmitted to an interpolation pre-processing section shown in FIG. 1.

It is to be noted that a retrograde mode is a mode wherein it is commanded by the working program to carry out, as shown by the working program in FIG. 4, retrograding movements corresponding to block commands 1 and 2 which include advancing movements.

In particular, referring now to FIG. 5, if a retrograding command is received at a position b of a tool T when the tool T should move from the position b to another position c with respect to a work after execution of the block commands 1 and 2 for advancing movements by which the tool has been moved to a position a and then to the position b, then retrograde block commands 3, 4 and 5 will subsequently be executed to carry out a retrograding operation.

Referring back to FIG. 3, if the retrograde flag is on at step S31, then the retrograde block processing section 3 judges, at subsequent step S32, whether a retrograde mode flag is on or off. In case the retrograde mode flag is on, the retrograde block processing section 3 stores, at step S33, information necessary for the carrying out of a retrograding operation into the retrograde block storage section 7 and then counts up a retrograde command block count at step S34.

Figure 6:
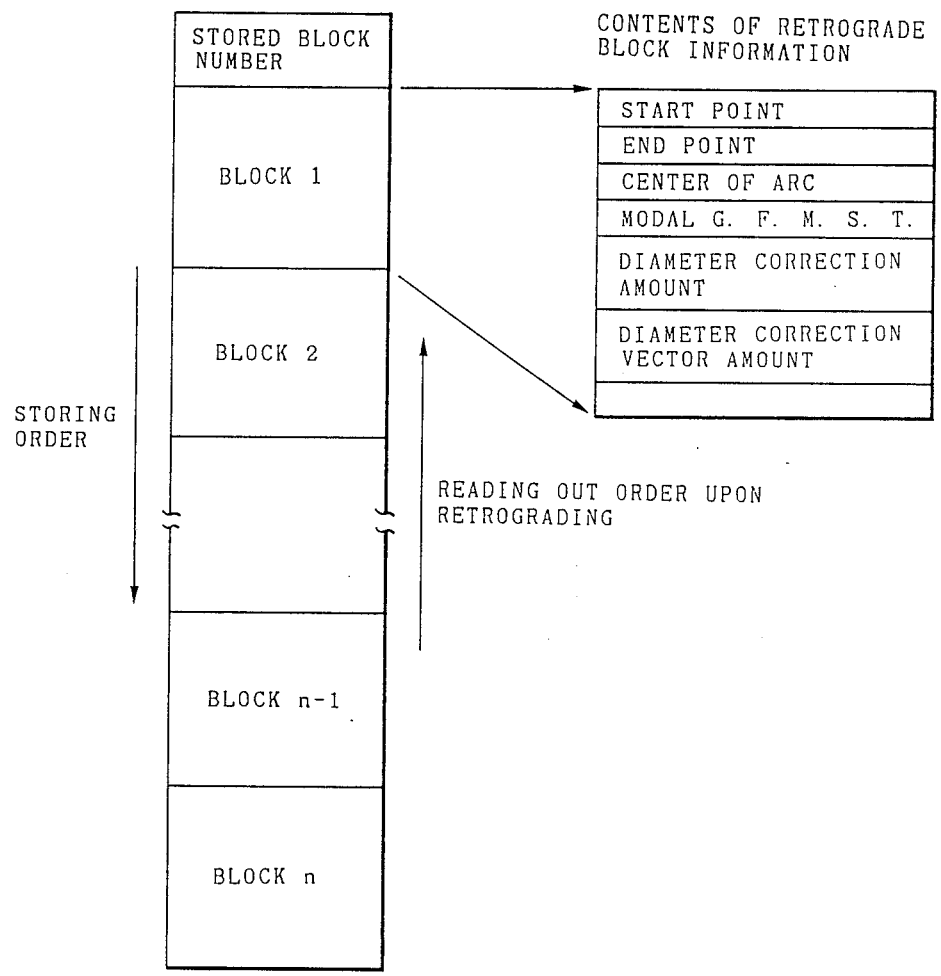
FIG. 6 is a schematic illustration showing stored contents of a retrograde block storage section shown in FIG. 1.

Stored contents of the retrograde block storage section 7 are stored in such a manner as shown in FIG. 6. In particular, the retrograde block storage section 7 has data of block commands stored therein in an order in which the data have been read out by the interpolation pre-processing section 2 and also has stored therein the number of block commands which are stored in the retrograde block storage section 7.

Stored data of each block command may include a position of a start point, an end point, a position of the center of an arc, modal data (G, F, M, S, T), a diameter correction amount, a diameter correction vector and so forth.

Referring back to FIG. 3, in case the retrograde mode flag is off at step S32, the retrograde block processing section 3 judges at step S35 whether or not there is a retrograde mode off command. If there is a retrograde mode off command, the number of retrograde block commands stored in the retrograde block storage section 7 is cleared to zero at step S36.

On the other hand, in case the retrograde flag is on at step S31, the retrograde block processing section 3 judges at step S37 whether or not the current command block is the first block for a retrograding operation. If the current command block is not the first block, then the retrograde block processing section 3 counts down the number of retrograde block commands by one at step S38.

At step S39 to which the process advances from step S34, S36 or S38, the retrograde block processing section 3 outputs data obtained by decoding a block command to the interpolation processing section 4 whether the retrograde flag is on or off.

Referring back to FIG. 2, the interpolation processing section 4 executes, at step S12 subsequent to step S11, interpolation processing in accordance with command data received from the retrograde block processing section 3 and outputs a result of the processing to the acceleration/deceleration controlling section 5. The acceleration/deceleration controlling section 5 executes, at step S13, acceleration processing or deceleration processing in accordance with the result of the processing by the interpolation processing section 4 and outputs a position command of a result of the processing to the feeding device 6. The feeding device 6 then executes position loop control in accordance with such position command at step S14.

Then, if a retrograding command signal is received at step S15 while such position loop control is being executed, then the retrograde controlling section 7 outputs, at step S16, an interpolation stopping command to the interpolation processing section 4 and also outputs a retrograding command to the interpolation pre-processing section 2.

To the contrary, if no retrograde command signal is received at step S15, then the process returns to step S10 to repeat the processing at steps S10 to S15.

At step S17 subsequent to step S16, the interpolation processing section 4 stops the interpolation processing thereof in response to the interpolation stopping command received and further stops its outputting of a result of interpolation processing to the acceleration/deceleration processing section 5. Consequently, the feeding device 6 is put into a stopping condition at step S18.

Then at step S19, the interpolation pre-processing section 2 stops, in response to the retrograding command signal received, its reading of the working program from the working program storage medium 1 and further stops its outputting of a position command. Then at step S20, the interpolation pre-processing section 2 causes the retrograde block command producing section 2a thereof to produce a retrograde block command. After then, the interpolation pre-processing section 4 executes, at step S21, the retrograde block command produced by the retrograde block command producing section 2a.

Figure 7:
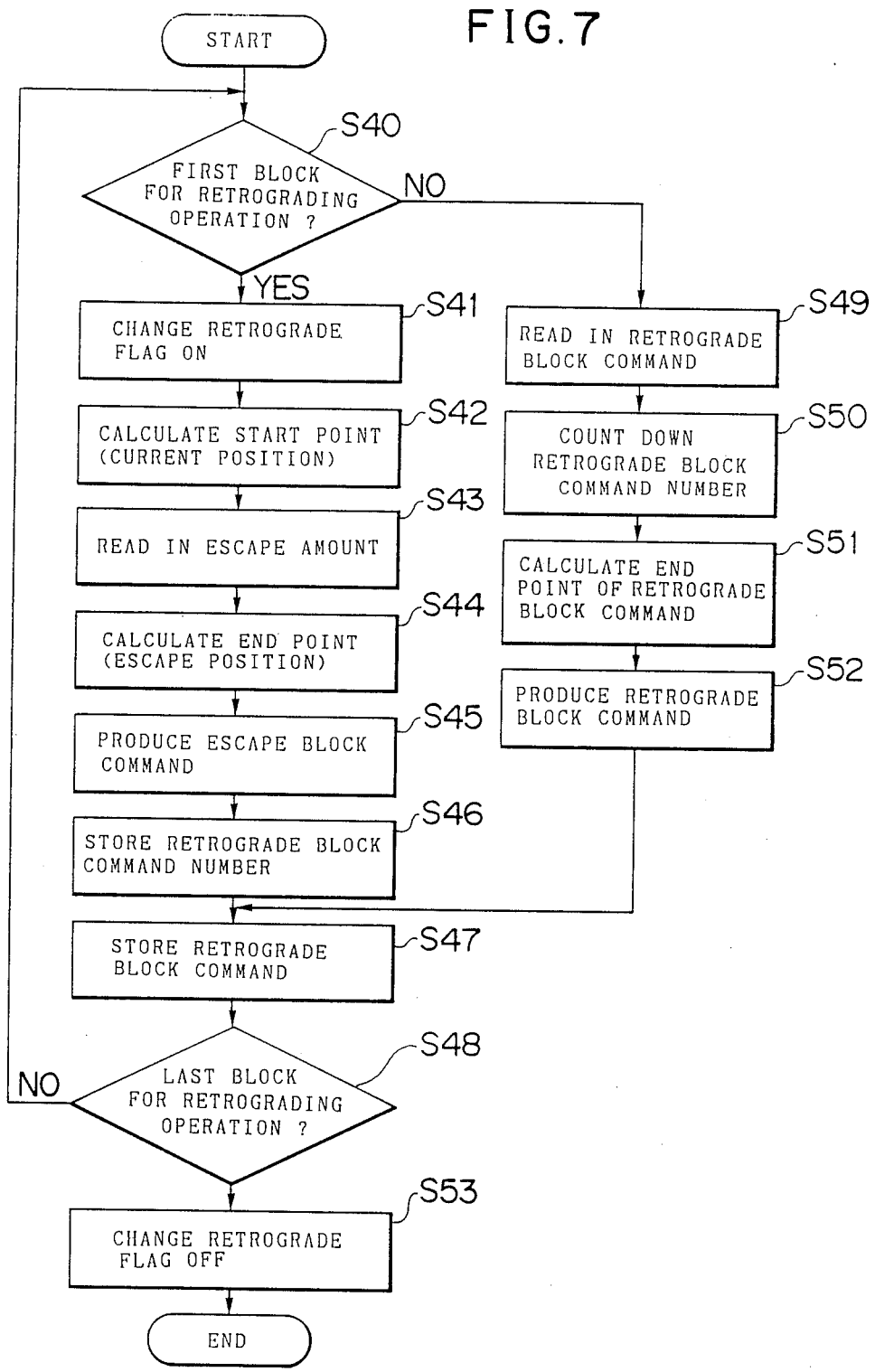
FIG. 7 is a flow chart showing operation of a retrograde block command producing section shown in FIG. 1.

The retrograde block command producing section 2a produces a retrograde block command in accordance with a flow chart shown in FIG. 7.

Referring to FIG. 7, the retrograde block command producing section 2a judges at first at step S40 whether or not a first block command for a retrograding operation is to be produced. The first block command for a retrograding operation here is such a block command 3 as shown in FIG. 4, that is, a block command for causing the tool T to escape from the work.

In case it is judged at step S40 that a first block command for a retrograding operation is to be produced, the retrograding block command producing section 2a changes the retrograde flag into an on-state at step S41, and then at step S42, calculates the position b of the tool T when the operation of the tool T is stopped and determines the position b as a start point.

Then at step S43, the retrograde block command producing section 2a reads a retrograde escape amount from the retrograde escape amount storage section 9, and then calculates, at step S44, a position of an end point d by vector calculation.

Figure 5:
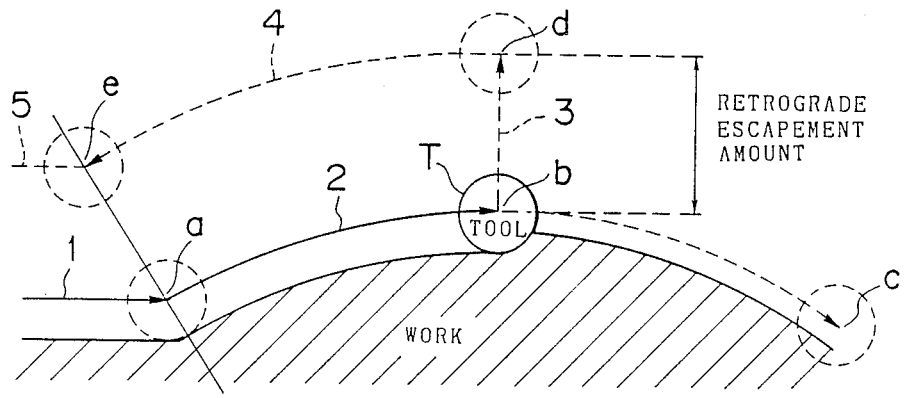
FIG. 5 is a diagrammatic representation illustrating a retrograding operation.

As shown in FIG. 5, if a retrograding command is received during execution of a block command 2, then modal information is read in from the block command 2 and a G command is changed into G1 command, and then a diameter correction mode is cancelled, whereafter the start point and end point thus calculated are set to produce an escape block command at step S45.

On the other hand, if a retrograding signal is received at the point b while the tool T is being moved from the point a to the point c in accordance with circular interpolation by execution of the block command 2 as shown in FIG. 5, then an escapement block command 3 will be produced. The escapement block command 3 is a command for moving the tool T in accordance with linear interpolation by a retrograde escape amount in a direction perpendicular to a tangential line to an arc at the point b (that is, a correction direction in diameter correction). As a result of execution of the escapement block command 3, the tool T is moved sufficiently away from the work into a non-contacting condition.

Then, the retrograde block command producing section 2a reads, at step S46, the number of block commands stored in the retrograde block storage section 8, and then outputs, at step S47, data of a block command thus produced to the retrograde block processing section 3 so that it may be stored into the latter.

Then, in case the number of block commands is not equal to zero at step S48, that is, in case the current block is not the last block for the retrograding operation, the process returns to step S40.

On the other hand, if it is judged at step S40 that the current block is not the first block (that is, the current block is a retrograde block command 4), then the retrograde block command producing section 2a reads, at step S49, retrograde block information of the block command 2 from the retrograde block storage section 8, and then counts down, at step S50, the number of retrograde blocks by one.

Then at step S51, the retrograde block command producing section 2a calculates a position of the end point (point e), and then changes, at step S52, the modal G command from a G2 command to a G3 command and cancels the diameter correction mode to produce a retrograde block 4, whereafter the retrograde block command producing section 2a outputs, at step S47, the retrograde block 4 to the retrograde block processing section 3 so that it may be stored into the latter.

The retrograde block command producing section 2a thus executes the processing at steps S49 to S52 repetitively until after the number of retrograde blocks counted down at step S50 becomes equal to zero.

It is to be noted that, since a block command 5 is the G1 block, the G1 command is left as it is for data of the block command 1 read in from the retrograde block storage section 8 while changing of the end point and cancellation of the diameter correction mode are executed, and data of a block command thus produced are outputted to the retrograde block processing section 3.

If it is judged at step S48 that the number of retrograde block commands counted down is equal to zero, then the retrograde block command producing section 2a changes, at step S53, the retrograde flag into an off-state, whereafter the process of the interpolation pre-processing section 2 returns to its normal interpolation pre-processing.

Then, the block command 2 is circularly interpolated reversely, and then the block command 1 is linearly interpolated reversely.

Also in this instance, a retrograding operation in a completely non-contacting condition is realized by interpolating the positions of the start point and the end point which are each corrected by a retrograde escape amount in the direction of a diameter correction vector.

In particular, the retrograde block command 4 corresponding to the block command 2 from the point b to the point a is a retrograding movement from the point d to the point e while the retrograde block command 5 corresponding to the block command 1 from the point a is a movement from the point e.

It is to be noted that, while no correction is made to the moving speed in the present embodiment, it is also possible to provide an override or the like to the retrograding movement to achieve high speed retrograding operation.

Figure 8:
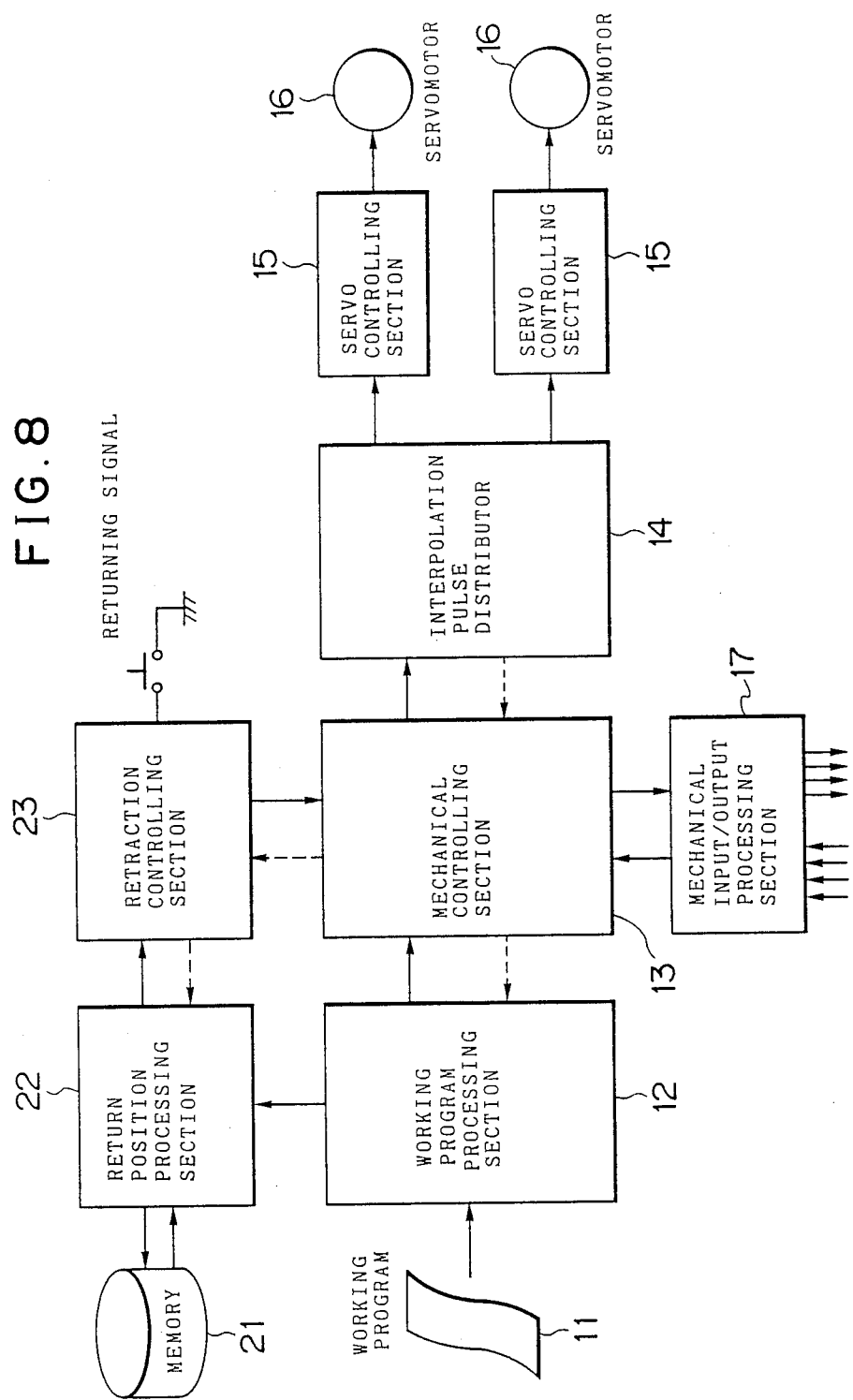
FIG. 8 is a block diagram of a numerically controlled apparatus showing another preferred embodiment of the present invention.

Referring now to FIG. 8, there is shown in block diagram a numerically controlled apparatus of another preferred embodiment of the present invention. The numerically controlled apparatus shown includes a working program processing section 12 for receiving a working program stored in a working program storage medium 11 and composed of a plurality of block commands, a mechanical controlling section 13, an interpolation pulse distributor 14, a pair of servo controlling sections, a pair of servomotors 16, a mechanical input/output processing section 17, a non-volatile memory 21, a return position processing section 22 for storing into the memory 21 and controlling a return position discriminated by the working program processing section 12, and a retraction controlling section 23 for producing, upon interruption of working, a return block command to the return position stored in the memory 21 and outputting the thus produced return block command to the mechanical controlling section 13.

Figure 9:
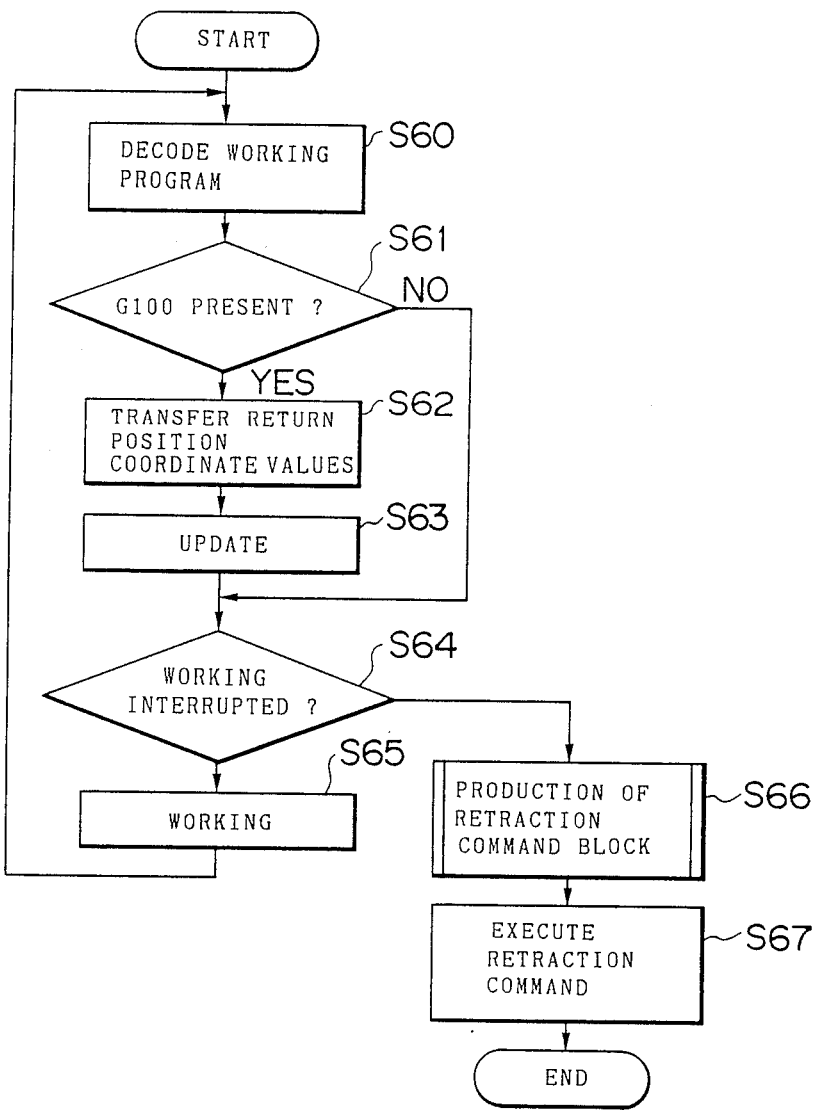
FIG. 9 is a flow chart showing operation of the numerically controlled apparatus shown in FIG. 8.

Subsequently, operation of the numerically controlled apparatus shown in FIG. 8 will be described with reference to a flow chart of FIG. 9.

At first at step S60, the working program processing section 12 reads out and decodes a block command from the working program of the working program storage medium 11.

Figure 11A:
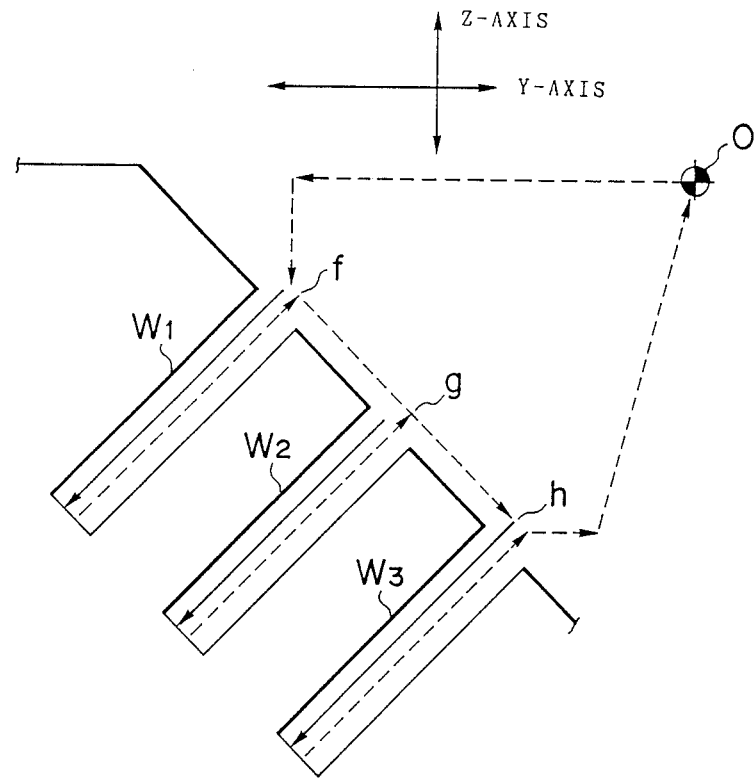
FIGS. 11a and 11b are diagrammatic representations each illustrating a retrograding operation.

FIG. 10 illustrates the working program for designating a return position which is to be executed by the present numerically controlled apparatus. The working program is designed such that, as shown in FIG. 11a, operation is started from a working origin 0 and working of inclined holes $W_1$, $W_2$ and $W_3$ is carried out successively while moving a tool at a high speed along each broken line and at a cutting speed along each solid line.

In the working program shown in FIG. 10, a block command designated by G100 designates a return position together with an actual positioning command. In particular, the block command designates return positions f, g and h when the inclined hole $W_1$, $W_2$ or $W_3$ is being worked.

Thus, referring back to FIG. 9, in case the working program processing section 12 decodes the block command of G100 at step S61, values of coordinates of the block command, that is, values of coordinates (X, Y, Z) of a return position, are transferred to the return position processing position 22 at step S62.

Each time values of coordinates of a return position are transferred from the working program processing position 12 to the return position processing section 22, the working program processing section 22 stores the values of coordinates into the memory 21 to update values of coordinates of a return position at step S63. Accordingly, the memory 21 always has latest coordinate values of a return position stored therein.

Then, in case working is not interrupted at step S64, the working will subsequently proceed in accordance with the working block at step S65. On the contrary, however, if the working is interrupted, then the retraction controlling section 23 produces, at step S66, a return block command from a point at which the working has been interrupted to the latest return position stored in the memory 21 in accordance with a flow chart shown in FIG. 12.

Figure 11B:
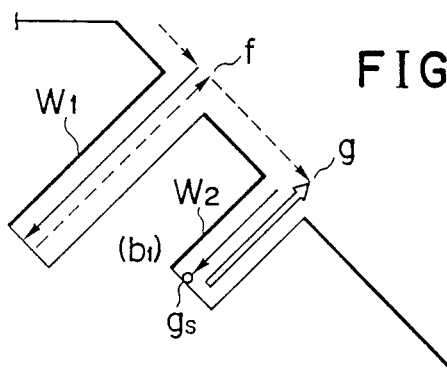

In case the working is interrupted, for example, at a position $g_5$ as seen in FIG. 11b, the retraction controlling section 23 produces a return block command to a latest return position b. It is to be noted that the return block command is produced as axial interpolation commands simultaneously for both of the X- and Z-axes.

Figure 12:
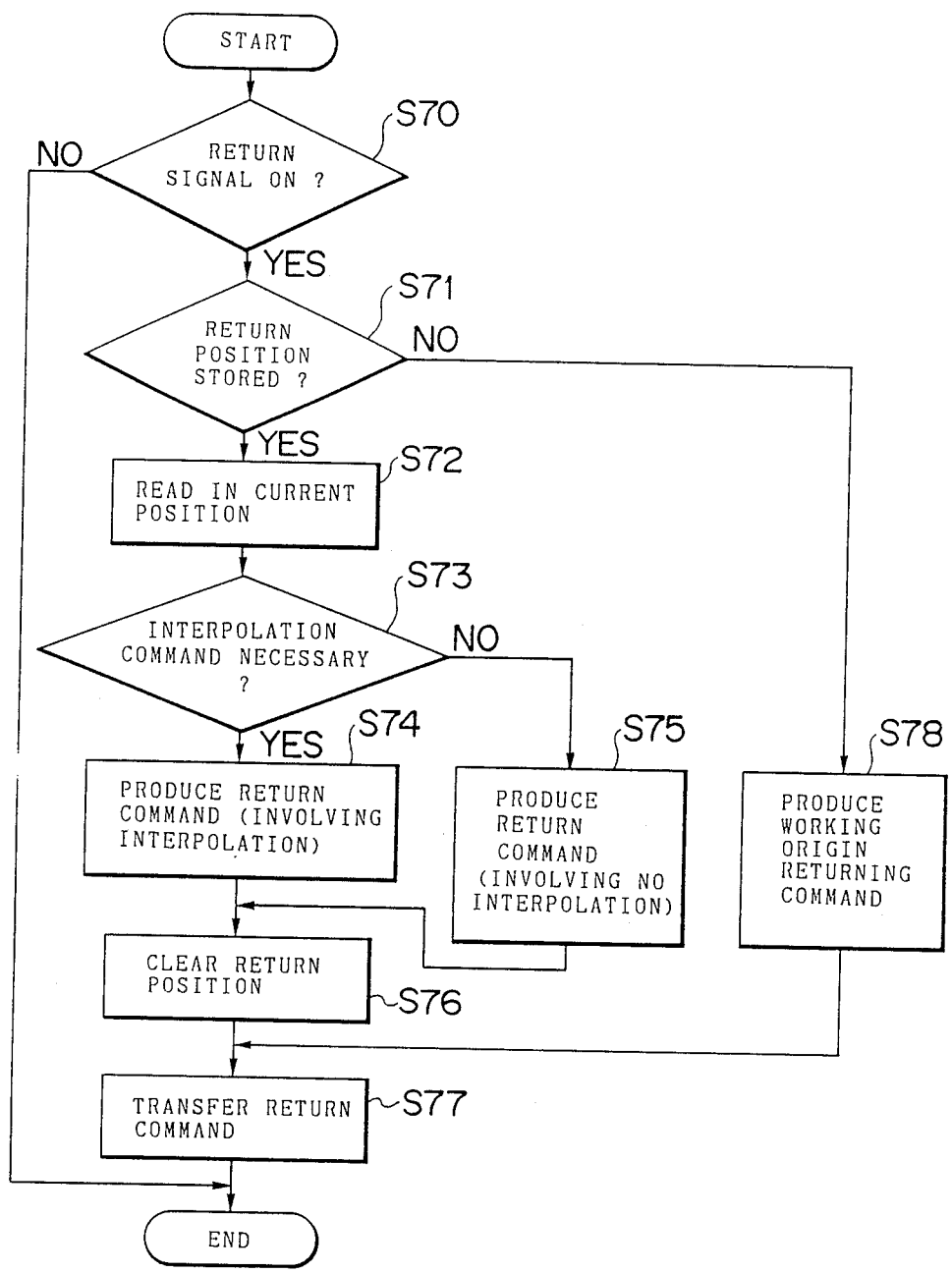
FIG. 12 is a flow chart showing operation of a retraction controlling section shown in FIG. 11.

Referring to FIG. 12, if a return signal is on at step S70, then the retraction controlling section 23 judges, at step S71, whether or not the memory 21 has a return position stored therein.

It is to be noted that the retraction controlling section 23 periodically monitors an output of the return signal at certain intervals of time and does not produce a return block command until after the return signal is changed into an on-state.

In case a return position is stored in the memory 21 at step S71, the retraction controlling section 23 reads, at step S72, a current position, that is, a position at which the working has been interrupted, and then compares, at step S73, the current position and the return position to judge whether or not an interpolation command is necessary.

In case it is judged at step S73 that an interpolation command is necessary, the retraction controlling section 23 produces, at step S74, a return block command involving interpolation.

On the contrary, in case no interpolation command is necessary at step S73, the retraction controlling section 23 produces a return block command involving no interpolation at step S75.

After completion of production of a return block command, the retraction controlling section 23 clears, at step S76, the return position stored in the memory 21 and transfers, at step S77, the return command block thus produced to the mechanical controlling section 13, thereby completing the process.

In case a return signal is received again after transfer of the return block command, since the return position has already been cleared (refer to step S76), the retraction controlling section 23 produces, at step S78, a retraction block command for the returning to the working origin. The retraction block command is processing for returning the tool to the working origin after it has been retracted to the return position f, g or h.

Referring back to FIG. 9, the mechanical controlling section 13 gives up, at step S67, the working command which has been executed before the interruption and executes and outputs the retraction command to the interpolation distributor 14.

As a result of execution of such retraction command, the tool is retracted to the return position e, f or g and then returned to the working origin O.

In the present embodiment, since the block command is added to return the tool, for the retraction of the tool upon interruption of working, to the working origin (setting of a parameter) of the machine after the tool has been retracted to a return position designated by the working program, the tool can be returned to the working origin O fixed with the machine after it has been retracted to the return position along a safe route.

This signifies that, even when the power fails during working, the tool can be retracted once to a return position and then returned to the origin in accordance with the retraction block command for the returning to the origin.

Figure 13:
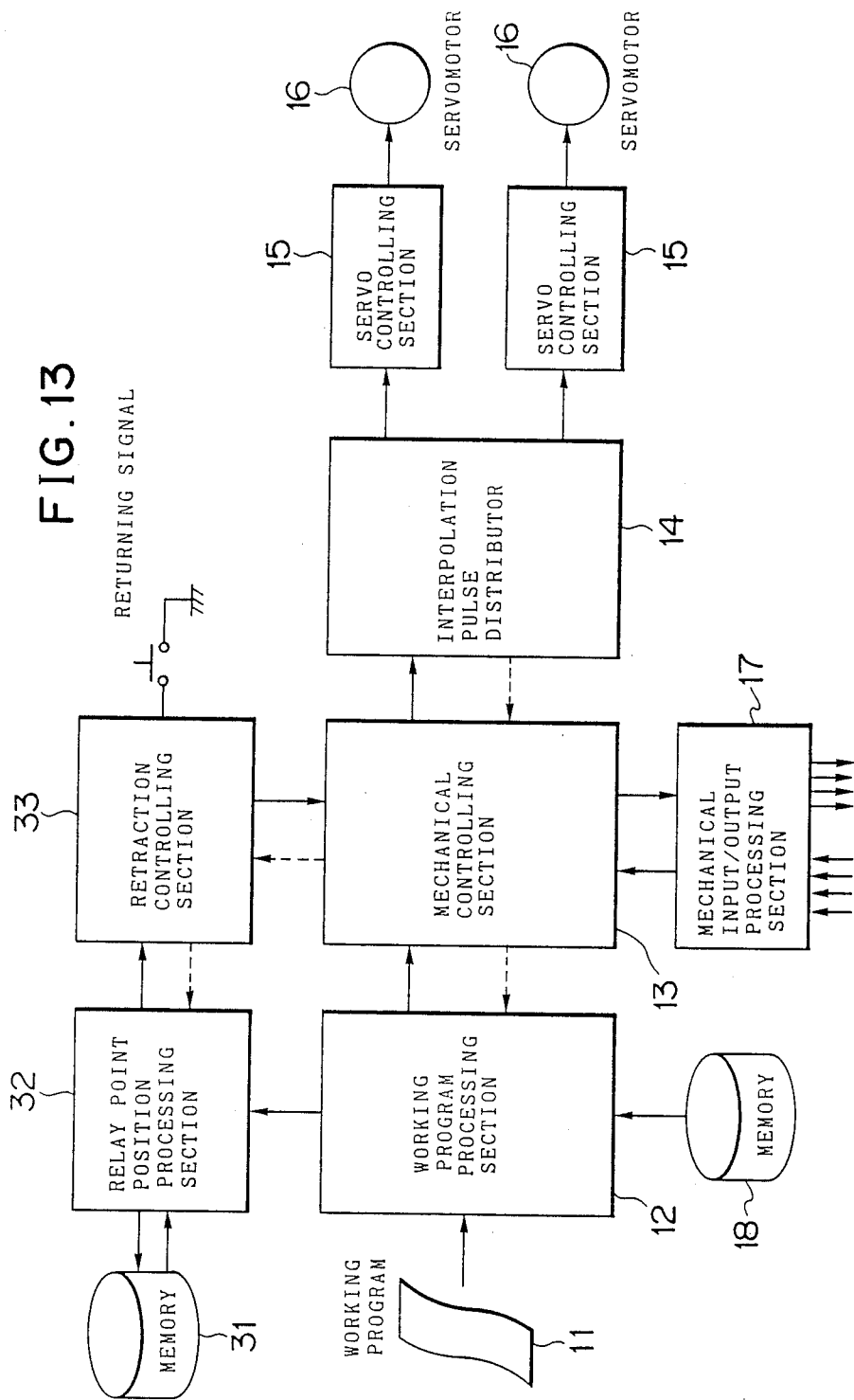
FIG. 13 is a block diagram of a numerically controlled apparatus showing a further embodiment of the present invention.

Referring now to FIG. 13, there is shown in block diagram a numerically controlled apparatus of a further preferred embodiment of the present invention. It is to be noted that like elements having like functions are denoted by like reference numerals to those of FIG. 8 and overlapping description thereof is omitted herein. The numerically controlled apparatus of the present embodiment includes, in addition to a working program processing section 12, a mechanical controlling section 13, an interpolation pulse distributor 14, a pair of servo controlling sections, a pair of servomotors 16 and a mechanical input/output processing section 17, a memory 18 in which a sub program of a fixed cycle is stored, a non-volatile memory 31 for storing a position of a relay point therein, a relay point position processing section 32 for storing into the memory 31 and controlling a relay point position judged by the working program processing section 12, and a retraction controlling section 33 for producing, upon interruption of working, a retraction block command to a relay point position stored in the memory 31 and for outputting, when a return signal is received from the outside, the retraction block command thus produced to the mechanical controlling section 13.

Figure 14:
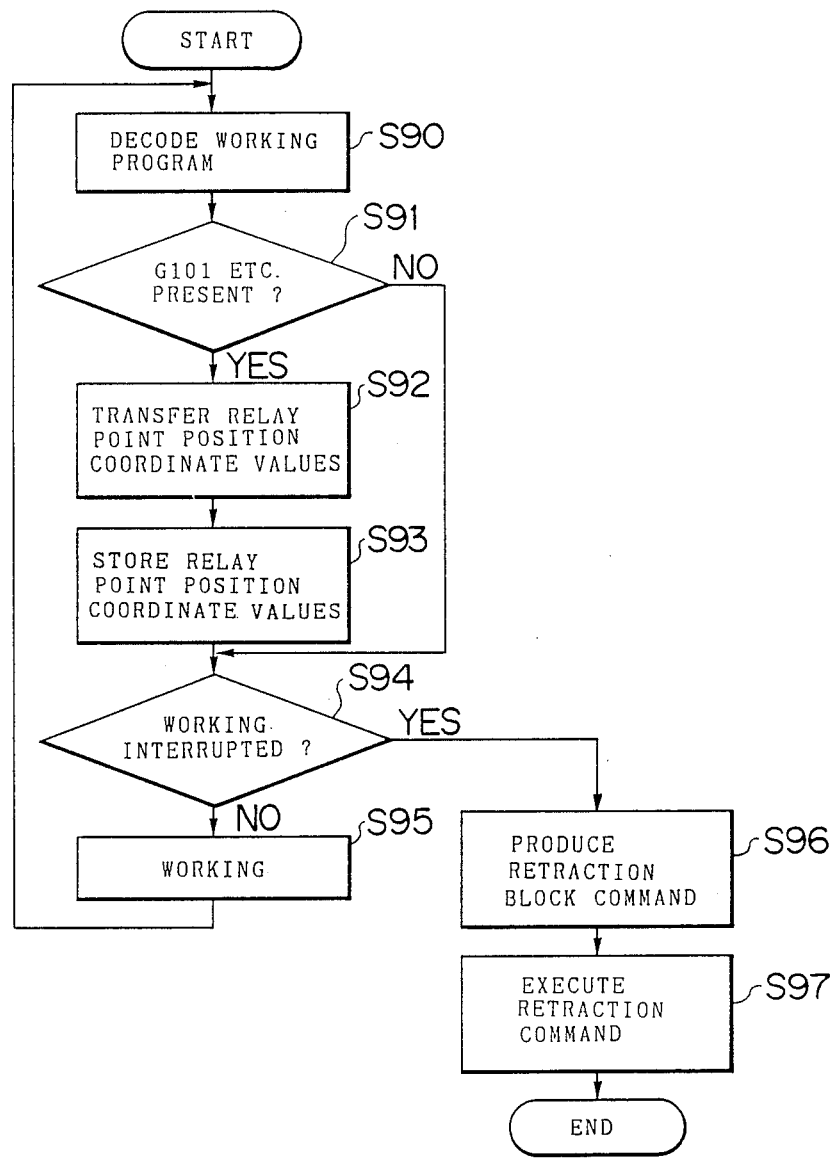
FIG. 14 is a flow chart showing operation of the numerically controlled apparatus shown in FIG. 13.

Subsequently, operation of the numerically controlled apparatus shown in FIG. 13 will be described with reference to a flow chart shown in FIG. 14.

At first at step S90, the working program processing position 12 reads out and decodes a block command of the working program of a fixed cycle of the memory 18.

FIG. 15 shows a program of a fixed cycle for designating a relay point position in fixed cycle working to be executed by the present numerically controlled apparatus.

The working program of the fixed cycle involves, as shown in FIG. 16a, starting of movement of a tool from a working origin O and feeding of the tool at a high speed along each broken line and at a cutting speed along each solid line to successively carry out working of two holes $W_4$ and $W_5$.

In the working program shown in FIG. 15, each of block commands designated by G100, G101 and G102 designates a relay point position together with an actual positioning command. In particular, when fixed cycle working is being carried out, relay points, i, j and k when the holes W4 and W5 are being worked are designated as the fixed cycle sub program is executed.

Referring back to FIG. 14, after the working program processing section 12 decodes the blocks of G100, G101 and G102 at step S91, it transfers coordinate values of the block command, that is, values of coordinates (X, Y, Z) of relay points, to the relay point position processing section 32 at step S92.

Thus, the relay point position processing section 32 stores, at step S93, the coordinate values of the relay point positions transferred from the working program processing section 12 into the memory 31 for the individual G codes and then changes a relay point position storage flag into an on-state.

Then, if working is not interrupted at step S94, then working is executed at step S95 in accordance with the block command. But on the contrary if working is interrupted at step S94, then the retraction controlling section 33 produces, at step S96, a retraction block command from a point at which the working has been interrupted to a relay point which has been stored latest into the memory 31, in accordance with a flow chart shown in FIG. 17.

In this instance, in case working is interrupted, for example, at a point $k_5$ of the hole W5 as shown in FIG. 16b, the retraction controlling section 33 produces a retraction block command from the working relay point $k_5$ to a relay point k stored latest in the memory 31.

It is to be noted that the retraction block command is produced, in the case of G102, as simultaneous two axis interpolation commands for the directions of axes of a horizontal plane (X, Y) but is produced, in the case of G100 or G101, as simultaneous three axis interpolation commands for the X-, Y- and Z-axis directions.

Figure 17:
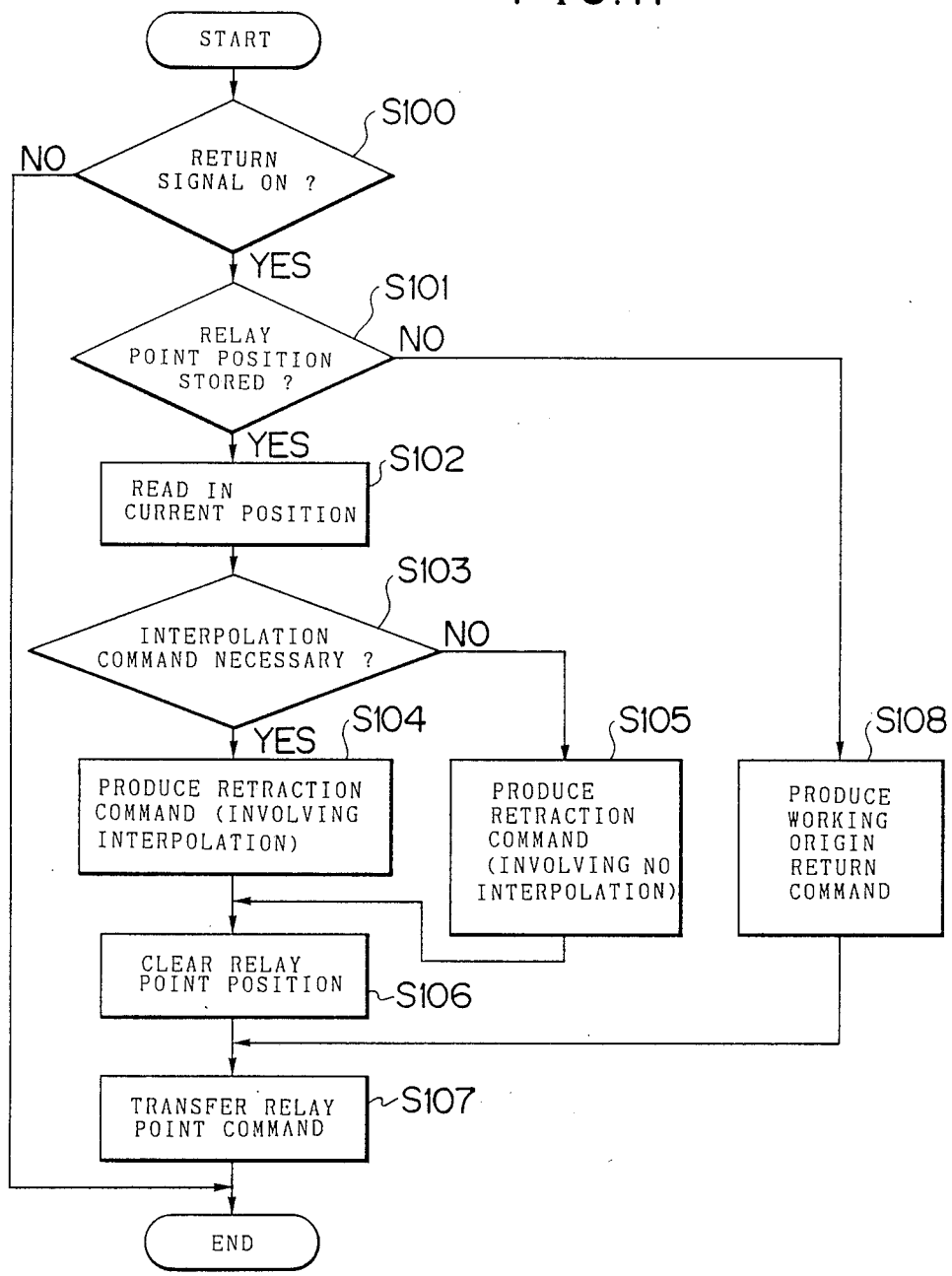
FIG. 17 is a flow chart showing operation of a retraction controlling section shown in FIG. 13.
Figure 18:
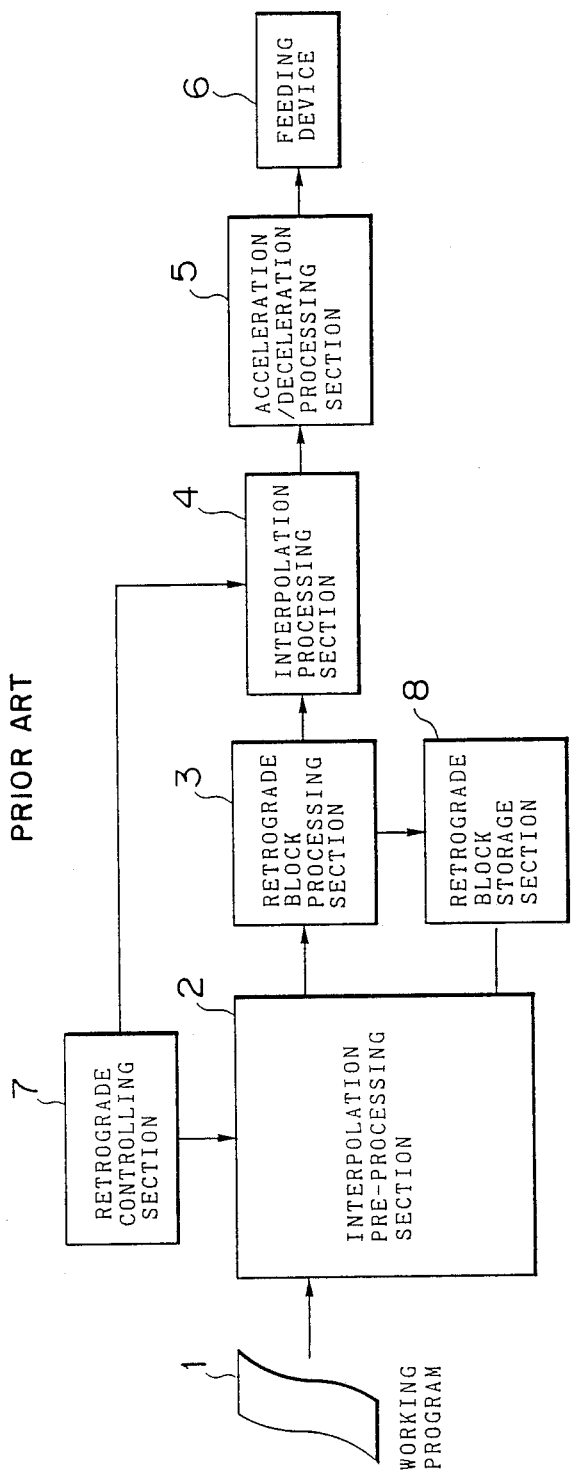
FIGS. 18, 19 and 20 are block diagrams showing different exemplary ones of conventional numerically controlled apparatus.
Figure 19:
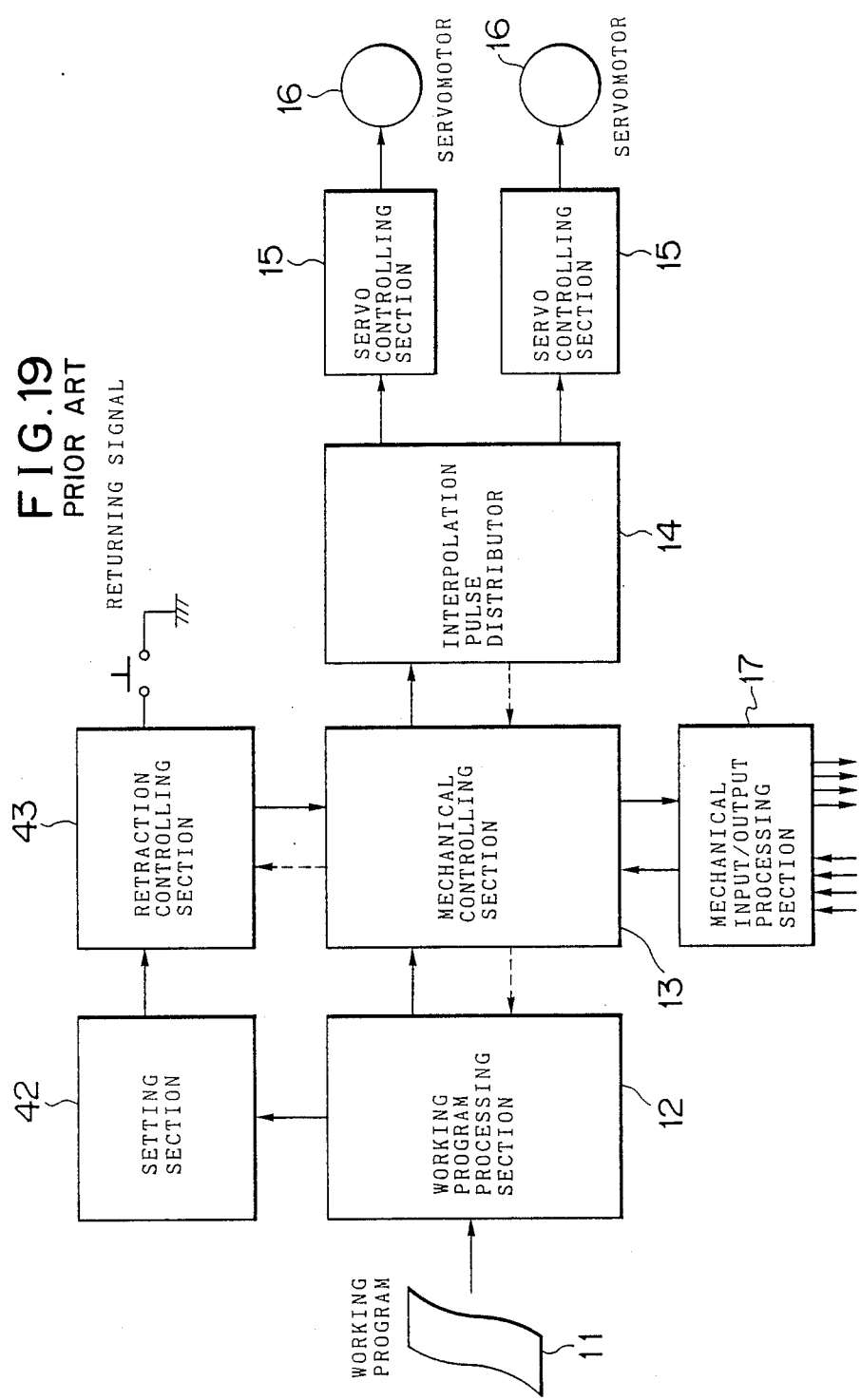
Figure 20:
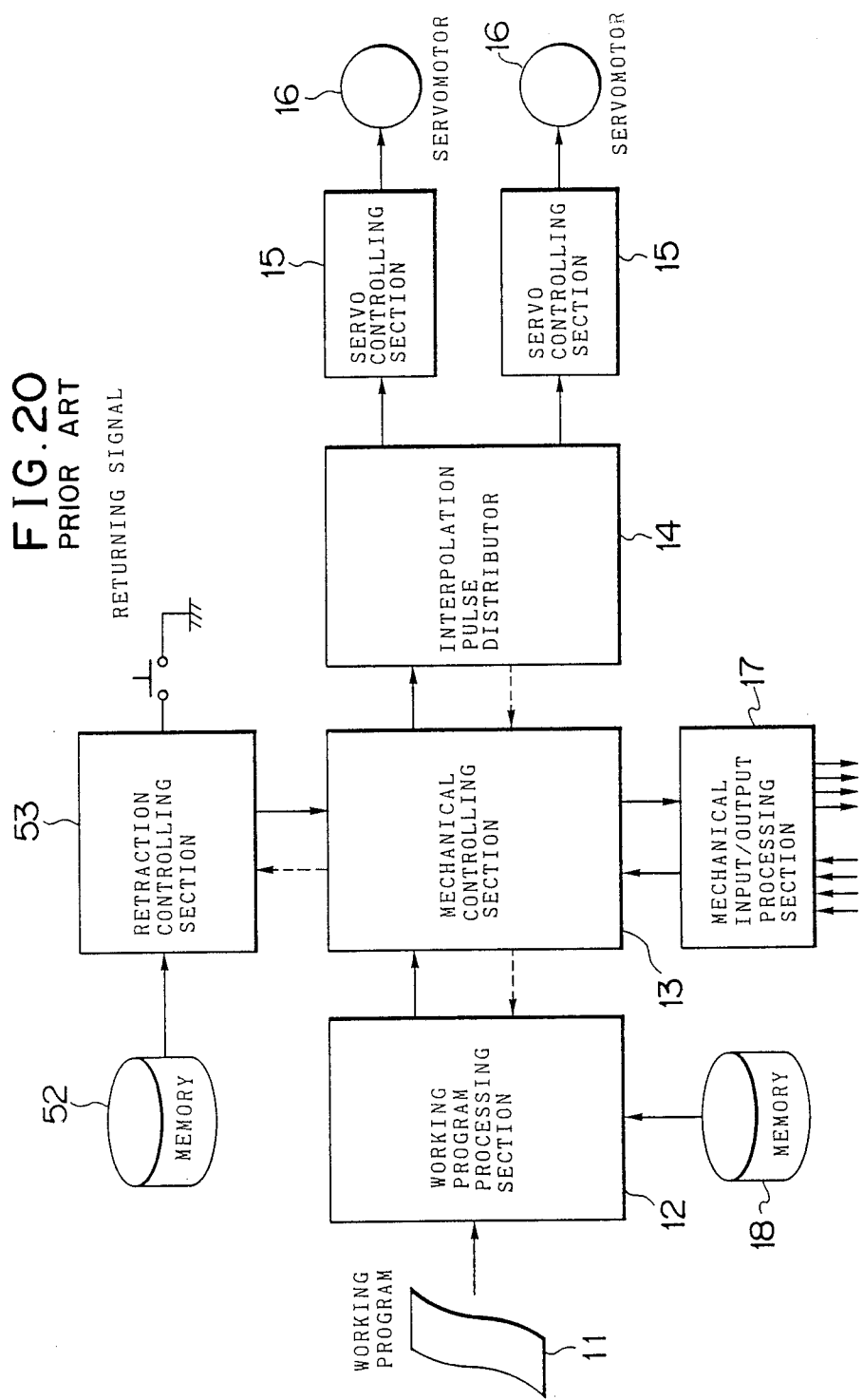

Referring to FIG. 17, if it is judged at step S100 that a return signal is on, the retraction controlling section 33 judges at step S101 whether or not the memory 31 has a position of a relay point stored therein.

It is to be noted that the retraction controlling section 33 periodically monitors an output of the return signal at certain intervals of time but does not produce a retraction block command unless the return signal is changed into an on-state.

In case a position of a relay point is stored in the memory 31 at step S101, a current position, that is, a position at which working is interrupted, is read in at step S102, and then the current position and the return position are compared with each other to judge whether or not an interpolation command is necessary at step S103.

When an interpolation command is necessary, the retraction controlling section 33 produces a retraction block command involving interpolation at step S104.

On the other hand, in case interpolation is not necessary at step S103, the retraction controlling section 33 produces a retraction block command involving no interpolation at step S105.

Thus, the retraction controlling section 33 repetitively executes production of retraction block commands from a relay point k to a relay point j and then from the relay point j to another relay point i until the memory 31 has no more relay point stored therein.

After completion of production of a retraction block command, the retraction controlling section 33 clears, at step S106, the relay point position flag stored in the memory 31 and then transfers, at step S107, the retraction block command thus produced to the mechanical controlling section 13, thereby completing the process.

When a return signal is received again after transfer of the retraction block command, since no more return position is stored already in the memory 31 (refer to step S106), the retraction controlling section 33 now produces, at step S108, a block command for returning the tool to the working origin O. The block command is processing to retract the tool once to the return position i, j or k and then return the tool to the starting origin O of the fixed cycle by way of the relay point stored in the memory 31. The tool can thus be retracted to the starting position of the fixed cycle by the processing.

Referring back to FIG. 14, after execution of the processing at step S96, the mechanical controlling section 23 gives up, at step S97, the block command of the fixed cycle which has been executed before the interruption of the working and then executes the retraction block command.

With the numerically controlled apparatus of the present embodiment, since a block command is added to retract, when working of a fixed cycle is interrupted, a tool to a start position of the fixed cycle and then return the tool from the start point of the fixed cycle further to a working origin O (setting of a parameter) of the machine, the tool can be retracted to the start point of the fixed cycle along a safe route and then returned to the fixed working origin O of the machine.

Further, even if the power fails during operation, the tool can be returned to the origin by an addition of a block command for the returning to the origin after the tool is retracted to the starting position of the fixed cycle.

Having now fully described the invention, it will be apparent to one of ordinary skill in the art that many changes and modifications can be made thereto without departing from the spirit and scope of the invention as set forth herein.

What is claimed is:

1. A numerically controlled apparatus, comprising:
   a block command executing means for decoding a working program composed of a plurality of block commands for each of such block commands and controlling driving of a tool to work a work;
   a retrograde block command storage means for extracting data necessary for the production of a retrograde block command from the working program and storing the extracted data therein;
   an escapement block command producing means for producing, upon reception of a retrograding signal, an escapement block command for moving the tool away from the work in accordance with a current position of the tool and a preset escapement amount;
   a retrograde block command producing means for producing a retrograde block command for causing the tool to retrograde in accordance with the data stored in said retrograde block command storage means; and
   an escapement/retrograde block command execution controlling means to execute the escapement block command executing means to execute the escapement block command and the retrograde block command.

2. A numerically controlled apparatus, comprising:
   a block command executing means for decoding a working program composed of a plurality of block commands for each of such block commands and controlling driving of a tool to work a work;

a non-volatile return position storage means for updating and storing, in case a return position is designated by the working program when the working program is to be executed for each of the block commands, the return position therein;

a return block command producing means for producing, upon reception of an interrupt signal, a return block command for returning the tool from a current position of the tool to the return position stored in said return position storage means; and a return block execution controlling means for causing said block command executing means to execute the return block command.

3. A numerically controlled apparatus, comprising:

a block command executing means for decoding a working program of a fixed cycle composed of a plurality of block commands for each of such block commands and controlling driving of a tool to work a work;

a relay point storage means for storing a position of a relay point designated by the program of the fixed cycle;

a retraction block command producing means for producing, when working of the fixed cycle is interrupted, a retraction block command for retracting the tool from a position at which the working is interrupted to the relay point which has been stored into said relay point storage means immediately before the interruption of the working in accordance with a route and an amount of movement of the tool when the working of the fixed cycle is interrupted; and a retraction block execution controlling means for causing said block command executing means to execute the retraction block command.

* * * * *